United States Patent
Glenister et al.

[11] Patent Number: 5,930,945
[45] Date of Patent: Aug. 3, 1999

[54] METHOD AND APPARATUS FOR PROTECTION AGAINST FLIES IN POULTRY AND LIVESTOCK MANURE

[75] Inventors: Carol S. Glenister, Locke; David Bishop, Groton, both of N.Y.

[73] Assignee: IPM Laboratories, Inc., Locke, N.Y.

[21] Appl. No.: 08/718,929

[22] Filed: Sep. 25, 1996

[51] Int. Cl.$^6$ .................................................. A01M 1/10
[52] U.S. Cl. ................................................ 43/121; 119/6.5
[58] Field of Search ............................... 43/58, 107, 121; 119/6.5

[56] References Cited

U.S. PATENT DOCUMENTS

| | | | |
|---|---|---|---|
| 4,646,683 | 3/1987 | Maedgen, Jr. | 119/6.5 |
| 4,966,329 | 10/1990 | Show | 239/650 |

OTHER PUBLICATIONS

Rutz, D. et al, 1993 Pest Management Recommendations for Poultry, Cornell and Penn State Cooperative Extension, pp. 1–12.

Gegen, G. et al, 1988, Predation by Carcinops pumilio (Coleoptera: Histeridae) and Macrocheles muscaedomesticae (Acarina: Macrochelidae) on the House Fly (Diptera: Musicidae): Functional Response, Effects of Temperature, and Availability of Alternative Prey, Entomological Society of America.

*Primary Examiner*—Daniel D. Wasil
*Attorney, Agent, or Firm*—Brown, Pinnisi & Michaels, P.C.

[57] ABSTRACT

An affordable means of protecting a barn against fly infestation by trapping in a novel trap design predatory arthropods such as *Carcinops pumilio* and *Macrocheles muscaedomesticae* from another barn having a mature predator population, and transferring the traps to accumulations of manure which are underpopulated with the predatory arthropods. The predators self-release onto the predator-free manure and establish themselves, preventing fly infestations which would normally occur. The trap of the invention is a box-like structure, having a filter surface on one side which has openings large enough to admit Hister beetles and Macrochelid mites, but small enough to prevent the entry of hide beetles and litter beetle pests. Inside the box is an appropriate bait material which will attract the desired predatory beetles or mites, such as a slurry of housefly eggs in water spread on absorbent material. The traps are spread across a mature manure pile. The bait lures the beetles and mites into the trap, and retains them there. After about 24 hours, the traps are collected and put on the recipient manure pile in the newly-cleaned barn. When the bait is depleted, the beetles and mites leave the trap and populate the recipient manure.

16 Claims, 2 Drawing Sheets

METHOD AND APPARATUS FOR PROTECTION AGAINST FLIES IN POULTRY AND LIVESTOCK MANURE

ACKNOWLEDGMENT OF GOVERNMENT SUPPORT

This invention was made with Government support under USDA CSREES SBIR Grant No. 95-33610-1487, awarded by the US Department of Agriculture. The government has certain rights in the invention.

FIELD OF THE INVENTION

The invention pertains to the field of natural protection of barns and the like against pests such as flies. More particularly, the invention pertains to methods and apparatus for trapping and using natural predators against flies in poultry or livestock manure.

BACKGROUND OF THE INVENTION

Manure-breeding muscid flies, particularly the house fly, *Musca domestica*, and occasionally the little house fly, *Fannia canicularis*, and the black garbage fly, *Hydrotaea aenescens*, are a serious problem for poultry producers in the northeastern United States. Other flies commonly associated with northeastern poultry operations, but rarely noticed, are small dung flies of the family Sphaeroceridae.

Fly populations may create a public health nuisance around the farm and in nearby communities, resulting in poor community relations and threats of litigation. House flies can transmit more than 100 human and animal-disease-causing organisms, including protozoa, bacteria, viruses, rickettsia, fungi, and worms. House flies are considered intermediate hosts for tapeworms and may transmit ascarids (parasitic roundworms) to caged birds. Flies carry ascarid and other nematode eggs on their feet from manure to pens, feed, and water. Fly maggots ingest tapeworm and ascarid eggs from the poultry manure and retain them in the gut until maturity. In turn, infected flies are ingested by the feeding bird. Although it appears that avian influenza is spread principally by contaminated shoes, clothes, and equipment, the virus has been isolated from adult house flies.

Current pest control measures often rely on pesticides to keep pest populations below economic injury levels or nuisance thresholds. Since these thresholds are not well defined, control practices are generally carried out when the pests are observed on the birds or in the poultry house. Extensive or improper use of pesticides can result in the extermination of biological control agents and the development of pesticide resistance. It can also create harmful and illegal residues in meat and eggs and can contaminate the environment. Destruction of biological control agents and pesticide resistance results in larger pest populations, increased pesticide use, and higher control costs.

Besides flies, beetles, and mites, several beneficial insects and mites are often associated with accumulations of poultry manure. Predaceous arthropods such as mites, hister beetles, and parasitic wasps are all important biological control agents in suppressing fly populations. Proper cultural practices encourage poultry manure accumulations containing large populations of beneficial predators and parasites that can suppress house fly populations. In the Northeast, macrochelid mites and hister beetles are the major predators in caged-layer operations.

The macrochelid mite, *Macrocheles muscaedomesticae*, is the most common mite in poultry manure. The reddish brown mite, slightly less than 1/16 inch in size, feeds on house fly eggs and first-instar larvae. It can consume up to 36 house fly immatures per day. Mites are found on the outermost layer of the manure, particularly its peak. Macrochelids can cause substantial reductions in house fly numbers, but large mite populations are required for any appreciable impact.

The principal hister beetle in northeastern poultry houses is *Carcinops pumilio*, a small black beetle, approximately 1/8 inch long. It feeds on house fly eggs and first-instar larvae. Adult and immature hister beetles live in the surface layers of manure and forage for fly and mite prey. Each adult destroys an average of 54 housefly immatures per day at 80° F. Predation declines to 12 per day at 59° F., and increases to 83 per day at the higher temperature of 91° F. Starved beetles can consume as many as 104 immatures per day. Well-fed females lay up to 10 eggs per day, and live over 3 months. Hister beetles also consume all immature stages of the tiny dung flies (Sphaeroceridae) that occasionally break out at manure heaps.

For a more complete discussion of the control of pests in poultry barns, see "Pest Management Recommendations for Poultry" Donald A. Rutz & Charles W. Pitts, 1993, Cornell University/Penn State Cooperative Extension, upon which the preceding discussion was based, with additions by the inventor.

Fly control is excellent in manure packs that have high numbers of Hister Beetles and Machrochelid Mites. The inventor has observed densities as high as 250 beetles per quart of manure, and 12 beetles per square inch of manure surface. Up to 20 mites per square inch of manure surface have been observed, as well.

A severe fly breakout normally occurs in 3–6 weeks after cleaning the manure out of a barn (about two fly generations). The problem with depending upon natural populations of predators to control these outbreaks is the slow rate of natural re-colonization after the periodic cleaning out of manure accumulations. Natural re-colonization can be very slow—on the nature of twelve or more weeks, if at all.

While some insects can be purchased from commercial breeders, the inventor has not been able to find the specific predators used here. In any event, purchasing predators can be expensive in the quantities needed. In the past, some farmers have transferred manure from one barn which has a mature predator population to the newly cleaned-out barn, or attempted to vacuum up the predators off mature manure piles. This is a very risky procedure due to the chance of cross-infection of poultry diseases carried by the manure, and also due to the spread of undesirable hide beetle and litter beetle pests along with the desirable predators.

SUMMARY OF THE INVENTION

The invention presents an affordable means of protecting a barn against fly infestation by trapping predators such as *Carcinops pumilio* and *Macrocheles muscaedomesticae* in a novel trap design from another barn having a mature predator population, and transferring the traps to fresh accumulations of manure. The predators self-release onto the fresh, predator-free manure and establish themselves, preventing fly infestations which would normally occur.

The trap of the invention is a box-like structure, having a filter surface on one side which has openings large enough to admit Hister beetles and Macrochelid mites, but small enough to prevent the entry of hide beetles and litter beetle pests. Inside the box is an appropriate bait material which will attract the desired predatory beetles or mites, such as a slurry of housefly eggs in water spread on absorbent material.

The traps are spread across a mature manure pile. The bait lures the beetles and mites into the trap, and retains them there. After about 24 hours, the traps are collected and put on the fresh manure pile in the newly-cleaned barn. When the bait is depleted, the beetles and mites leave the trap and populate the new manure.

DESCRIPTION OF THE PREFERRED EMBODIMENT

The Novel Trap

Figure 1:
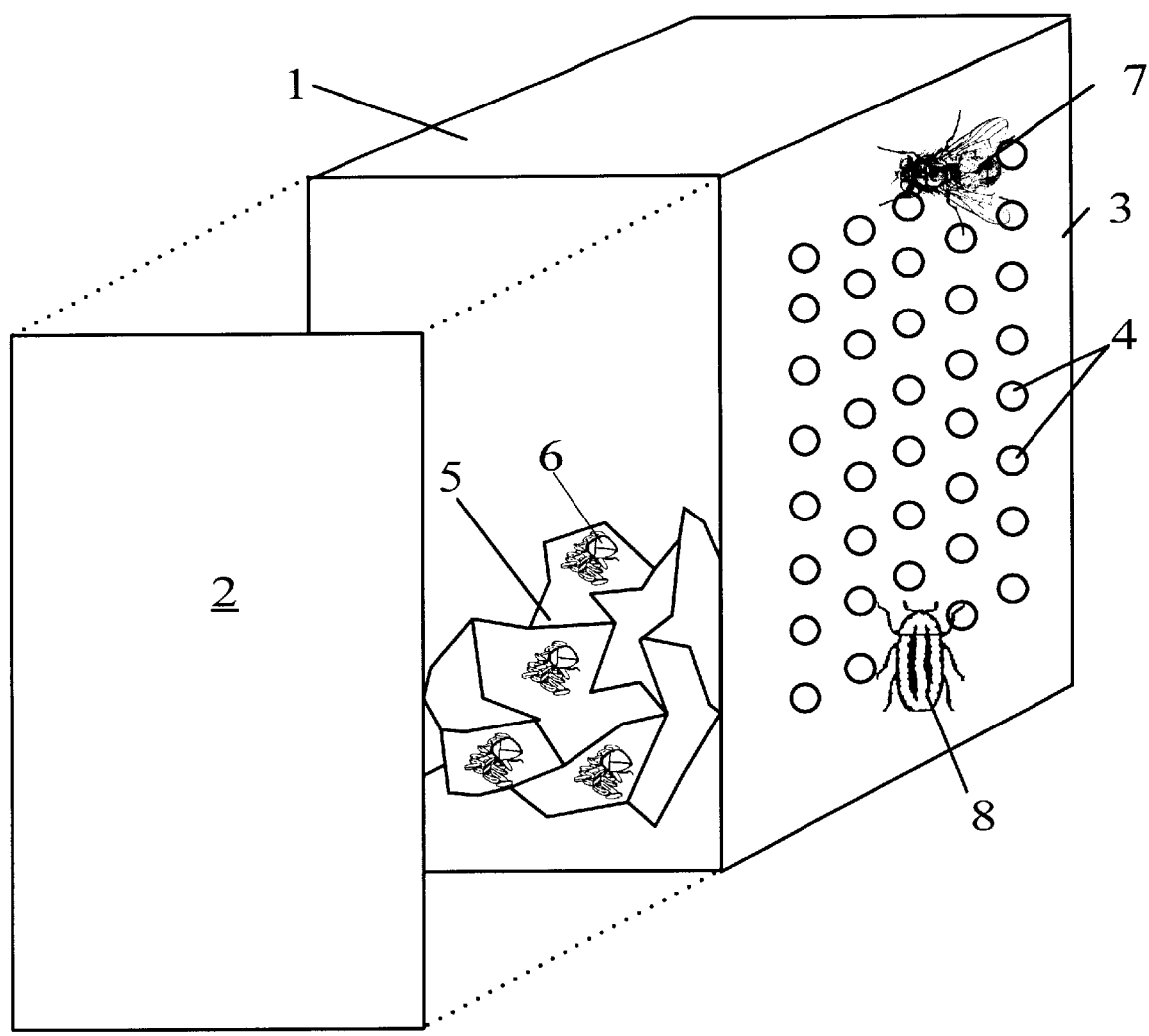
FIG. 1 shows a drawing of the trap of the invention.

FIG. 1 shows the novel trap of the invention, which is used in the method of the invention.

The trap has a closed body (1), which can be made of any material which is suitable to withstand degradation by environmental factors such as moisture, or by insect damage, for the period of 24 hours or so during which it will be left on a manure pile. The body might be square, as shown or some other shape such as cylindrical, as might be desired. A material such as lightweight plastic, Styrofoam, or waxed or coated cardboard would be appropriate. If desired, one side of the trap can be made transparent, so that the contents of the trap can be examined.

The box may be any convenient size, with dimensions of 2⅜"×3⅛"×3⅞" having been found to be useful. One side (2) of the box is shown removed in the drawing, so as to be able to see part of the interior of the trap.

Absorbent material within the trap contains the bait (5), which lures the desired Hister beetles and Macrochelid mites into the trap. The bait may be any of a number of substances. In tests, a slurry of housefly eggs in water, scattered across absorbent material such as a crumpled piece of paper towel or pelletized animal feed, has been found to be effective.

Another side (3) of the trap has a filter inset or formed into the side, admitting the desired mites (6) and Hister beetles, while blocking undesirable hide beetles (8) and flies (7). The filter surface has a number of holes (4), which are selected to be large enough to admit the desired species, while blocking the larger undesired species. In tests, a hole diameter of 0.05" to 0.06" has been found to be effective. This filter side may be formed of the material of the box, suitably perforated, or may be made of other material which is capable of being perforated appropriately and which will withstand contact with the manure. The filter may be square, as shown, or may be some other outline as desired, and similarly the holes may be square or round as desired. Materials such as rigid, light cardboard or plastic or metal screening would be useful for the filter.

Although for ease of illustration the trap is shown in FIG. 1 with the filter on one side, it will be understood that in actual use the filter would be placed downward, in direct contact with the manure pile.

Method of Protection

Figure 2:
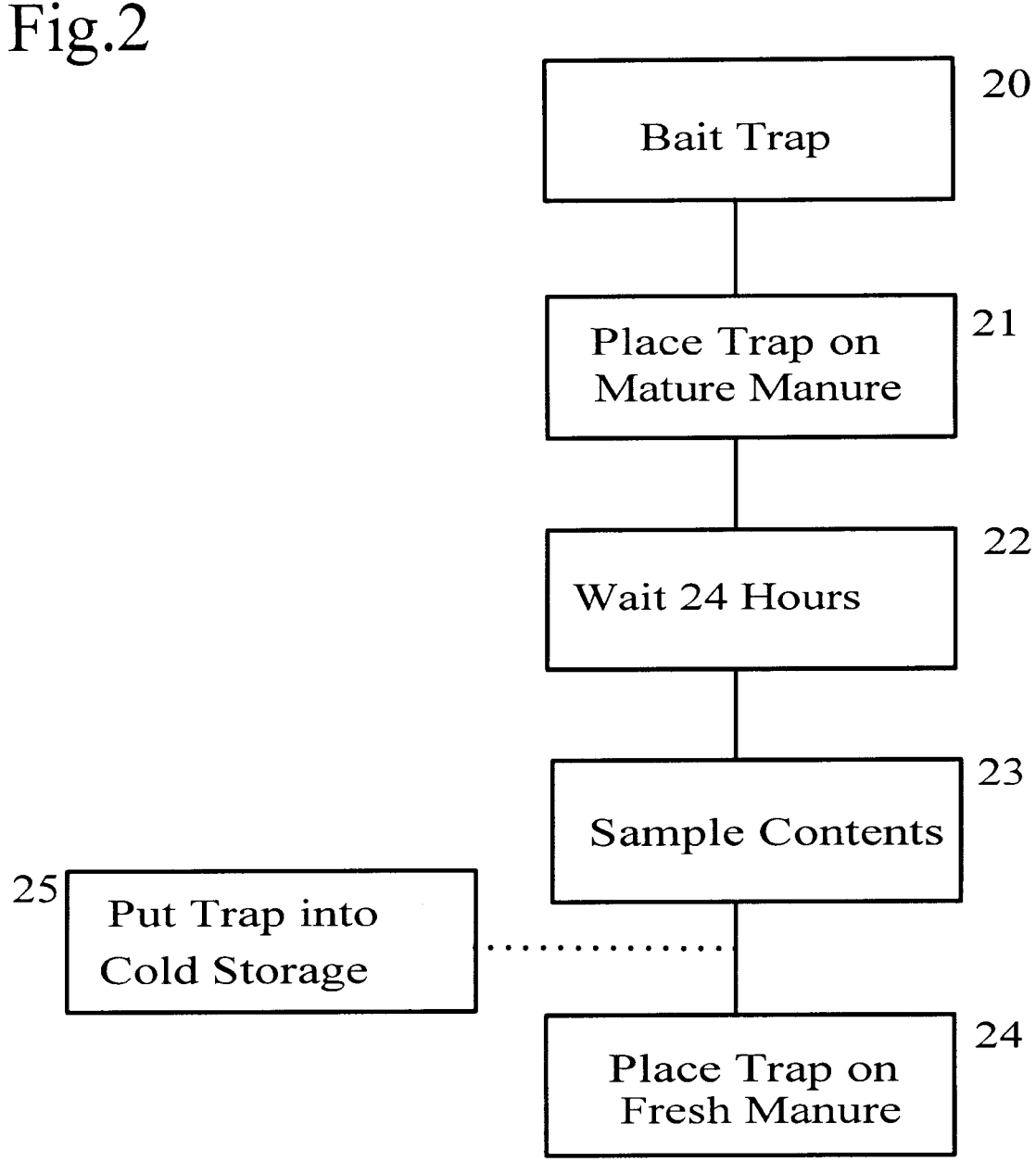
FIG. 2 shows a flowchart of the method of the invention.

The method of protection is shown in flowchart form in FIG. 2. The method uses a number of the traps of the invention to protect an area against fly infestation by transplanting predatory mites or beetles from another area. Although the number of traps used is not critical to the invention, a trap density of approximately 100 traps per 25,000 square feet of surface area would be effective.

Preferably, the method begins (20) by placing appropriate bait in the trap. As noted above, a bait which might be used is a slurry of housefly eggs in water, scattered across an absorbent material such as crumpled paper towel or pelletized animal food. Alternatively, a pre-prepared bait could be included in the trap at manufacture, and activated by removal of a cover strip or addition of moisture or by some other means.

Then (21), the baited traps are placed on a "mature" manure pile, preferably with the filter surface in contact with the surface of the manure. By "mature", is meant "a manure pile containing a population of the desired predators". The traps may be distributed evenly across the pile, or concentrated in an area of known predator density.

The traps are left on the pile for a period (22) of time sufficient for a quantity of predators to find the bait and enter the trap, but not so long as to allow the bait to be used up. A preferred period would be approximately 24 hours.

Then (23) the traps are removed from the mature pile and sampled to insure that the desired predators have been collected.

Then, optionally (25) the traps may be put in cold storage for a while to hold the predators for use, or in most cases (24) the traps will be spread around the area of fresh manure to be populated.

As the bait is used up by the predators, they will leave the traps through the filter holes, and will proceed to populate the new manure pile. This is termed "self-releasing", and does not require any handling of the insects or mixing of the bait with the manure.

After a while, perhaps 24 hours or more, the traps can be removed from the pile, if desired, or simply left there for disposal with the manure if the material is biodegradable (such as paper).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of protection of areas containing manure against infestations by pests, comprising:
    a) placing baited traps on a first accumulation of manure having a population of predatory arthropods which feed upon the pests in at least one stage of their life cycle, the traps comprising enclosures having a limited quantity of bait therein and a filter having openings of a diameter large enough to admit the desired predatory arthropods and too small to admit larger undesired arthropods;
    b) leaving the traps on the accumulation of manure for a preselected period sufficient to attract and trap a quantity of predatory arthropods;
    c) collecting the traps;
    d) placing the traps on a second accumulation of manure to be protected from pest infestation;
    e) leaving the traps on the second accumulation of manure for a preselected period of time at least long enough for the predatory arthropods to consume the limited quantity of bait and to leave the trap.

2. The method of claim 1, further comprising the step, before step (a) of baiting the traps with a bait comprising a substance attractive to the desired predatory arthropods.

3. The method of claim 2, in which the bait is a slurry of housefly eggs in water, spread on an absorbent support medium.

4. The method of claim 3, in which the support medium is paper towel.

5. The method of claim 3, in which the support medium is pelletized animal feed.

6. The method of claim 1, in which the pests are flies.

7. The method of claim 1, in which the predatory arthropods are the macrochelid mite, *Macrocheles muscaedomesticae*.

8. The method of claim 1, in which the predatory arthropods are hister beetles.

9. The method of claim 8, in which the hister beetles are *Carcinops pumilio*.

10. The method of claim 1, in which the traps are left on the first accumulation of manure for a period of approximately 24 hours.

11. The method of claim 1, in which the traps are left on the second accumulation of manure for a period of at least 24 hours.

12. The method of claim 1, further comprising the step, between steps (c) and (d), of storing the traps for a preselected time at a predetermined low temperature.

13. The method of claim 1, further comprising the step, between steps (c) and (d), of sampling the contents of the trap to evaluate the arthropods collected.

14. The method of claim 1, in which the first and second accumulations of manure are located in animal enclosures.

15. The method of claim 14, in which the second accumulation of manure is fresh manure in a recently cleaned livestock enclosure.

16. The method of claim 14, in which the first accumulation of manure is in a livestock enclosure which has not been cleaned for a period sufficient to develop a population of the predatory arthropods.

* * * * *